(12) United States Patent
Tsai et al.

(10) Patent No.: US 8,537,140 B2
(45) Date of Patent: Sep. 17, 2013

(54) ILLUMINATED TOUCH SENSITIVE SURFACE MODULE AND ILLUMINATED DEVICE THEREOF

(75) Inventors: Ming-Chieh Tsai, Hsin-Chu (TW); Hsin-Fu Hsu, Hsin-Chu (TW); Chien-Hao Chen, Hsin-Chu (TW)

(73) Assignee: Elan Microelectronics Corporation, Hsin-Chu (TW)

( * ) Notice: Subject to any disclaimer, the term of this patent is extended or adjusted under 35 U.S.C. 154(b) by 1087 days.

(21) Appl. No.: 12/509,476

(22) Filed: Jul. 26, 2009

(65) Prior Publication Data

US 2010/0134431 A1  Jun. 3, 2010

Related U.S. Application Data

(60) Provisional application No. 61/118,527, filed on Nov. 28, 2008.

(51) Int. Cl.
*G06F 3/042* (2006.01)
*G06F 3/041* (2006.01)

(52) U.S. Cl.
USPC .......... 345/176; 345/173; 345/175; 178/18.09

(58) Field of Classification Search
USPC ....... 345/156–157, 173, 175–176; 178/18.09
See application file for complete search history.

(56) References Cited

U.S. PATENT DOCUMENTS

| | | | |
|---|---|---|---|
| 6,680,448 B2 | 1/2004 | Kawashima et al. | |
| 2003/0063456 A1* | 4/2003 | Katahira | 362/27 |
| 2006/0066588 A1* | 3/2006 | Lyon et al. | 345/173 |
| 2008/0129701 A1* | 6/2008 | Murakami | 345/173 |

FOREIGN PATENT DOCUMENTS

| | | |
|---|---|---|
| CN | 101308425 A | 11/2008 |
| CN | 101441540 A | 5/2009 |
| JP | 57-71039 A | 5/1982 |
| KR | 1020080104858 A | 12/2008 |
| TW | M337792 U | 8/2008 |

OTHER PUBLICATIONS

China Official Action issued on Oct. 10, 2012.

* cited by examiner

*Primary Examiner* — Lun-Yi Lao
*Assistant Examiner* — Jarurat Suteerawongsa
(74) *Attorney, Agent, or Firm* — patenttm.us (57) ABSTRACT

An illuminated touch sensitive surface module and an illuminated device are disclosed. The illuminated touch sensitive surface module includes a cosmetic layer, a sensor, a controller and an illuminated device. The cosmetic layer permits light beams to pass through and objects to touch or hover thereon. The controller connects to the sensor and drives an illuminated mode of the illuminated device according to the position information. The illuminated device has many regions and at least one light guild film in which the light beams enter from the side and emit out of a top of individual light guide film. Further, each light guide film has a bottom on which micro members are formed for changing path of the entering light beams and block members for defining the regions. In the illuminated mode, the touched or hovered regions of the illuminated device are illuminated while the other regions are dark. Thus, the illuminated touch sensitive surface module provides the regional illumination in response to a gesture operation.

26 Claims, 8 Drawing Sheets

ILLUMINATED TOUCH SENSITIVE SURFACE MODULE AND ILLUMINATED DEVICE THEREOF

CROSS-REFERENCE

This application claims priority from U.S. Provisional Patent Application No. 61/118,527 filed on Nov. 28, 2008.

BACKGROUND

The present invention relates to a touch sensitive surface module, and more specifically, to the illuminated touch sensitive surface module and illuminated device responsive to the gesture operations by regional illumination.

The touch sensitive surface is now in widespread use such as laptop and mobile phone and having multiple functions such as control of a cursor of a GUI (Graphical User Interface), scrolling of a window and operation of virtual buttons. However, user may feel inconvenient in operation since they can't identify the position or the boundary of touch sensitive surface easily in the dark environment.

In addition, space for containing input interface of a portable electronic device such as common- or small-sized laptop and mobile phone is reduced due to the trend of thinness, light weight, fashion and integration of peripheral, and thus developing a touch sensitive surface or a display with more fancy functions has become another issue nowadays. However, it still lacks of the suitable vision effect generating element and the effective controlling mechanism so far.

BRIEF SUMMARY

It is therefore the objective of the present invention to provide an illuminated touch sensitive surface module having the illuminated device, the micro member and the block member for controlling the illuminated and the dark regions under the illuminated modes and hence interactive with user's one- or multi-finger gestures.

In one preferred embodiment, the illuminated touch sensitive surface module of the present invention includes a cosmetic layer, a sensor, a controller and an illuminated device. The cosmetic layer permits light beams to pass through and objects to touch or hover thereon. The sensor senses position information of the hovering or touching objects. The controller connects to the sensor and drives an illuminated mode of the illuminated device according to the position information. The illuminated device having a plurality of regions is set between the cosmetic layer and the sensor and includes one or more light guild films having individual and parallel top and bottom on which micro members are formed for changing path of the entering light beams and block members for defining the regions. In the illuminated mode, the touched or hovered regions of the illuminated device are illuminated while the other regions are dark.

In one preferred embodiment, an illuminated device of the illuminated touch sensitive surface module of the present invention having a plurality of illuminated regions set above the sensor for sensing the hovering or touching of an object. The illuminated device includes at least one light guild film having paralleled top and bottom on which the micro members are formed for changing paths of entered light beams and at least one block member for defining the regions, whereby the touched or hovered regions are illuminated while the other regions are dark.

In the preferred embodiment, an illuminated device of the illuminated touch sensitive surface module of the present invention having a plurality of illuminated regions set above the sensor for sensing the hovering or touching of an object. The illuminated device includes a plurality of light guild films, and each of them includes paralleled top and bottom and at least one block set along an orthogonal first and a second direction of the adjacent light guide films for defining a plurality of interlaced regions respectively. The first and the second micro members are set on the bottom of one and the other adjacent light guide films in accordance with the interlaced and separate regions. Therefore, the touched or hovered regions are illuminated while the other regions are dark.

In the preferred embodiment, the light effects constituted by the illuminated and the dark regions are cross-shaped, interlaced-shaped or plaid-shaped in accordance with application programs of object zooming or object rotation respectively.

In addition, at least one of density, position and shape of the micro members is different for controlling the light effects of each of the regions, and the micro members are the micro structures generated by screening printing or laser.

In the preferred embodiment, at least one of inside or surface of each layer is disposed with character, symbol or pattern. The illuminated device includes the first and the second light guide film on which a plurality of block members are set along the first and the second direction. The first direction and the second direction are orthogonal, and the first direction is column direction and the second direction is row direction.

The light guide films may be stacked and the mask member is set in the side of each one. The cross-shaped, interlaced-shaped or plaid-shaped light effect constituted by the illuminated and the dark regions is responsive to the application programs of object zooming or object rotation. Therefore, various light effects and the regional illumination may be implemented through controlling the light source and setting the block member, the micro member and the mask member.

Again, not only the regional but also intrinsic and interactive illumination in responsive to one- and multi-finger gesture may be implemented due to set the illuminated device and the sensor accompanying with the controller, the block member and the mask member.

For further understanding of these and other objectives, the nature and advantages of the invention, reference should be made to the following description taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
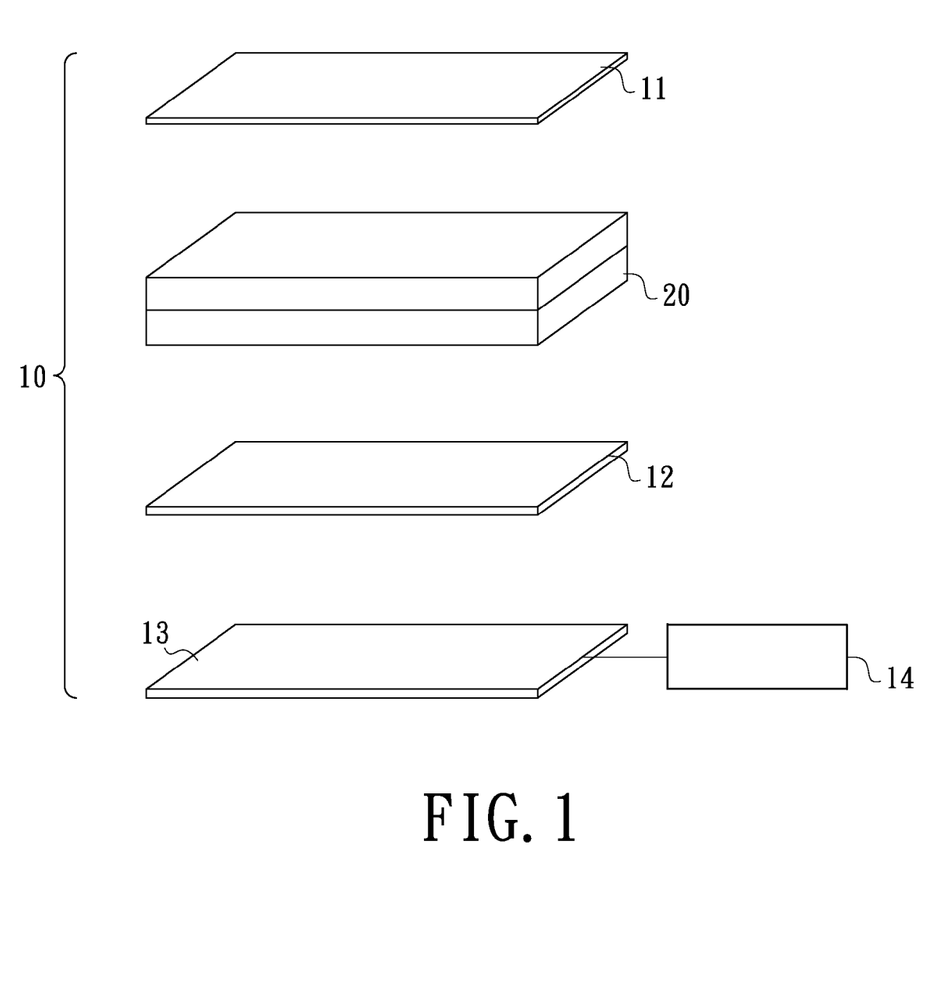
FIG. 1 is an exploded view of an illuminated touch sensitive surface module in accordance with a preferred embodiment of the present invention.

The present invention provides several embodiments of the illuminated touch sensitive surface module having fancy light effects and touch functions. As shown in FIG. 1, the touch sensitive surface module 10 includes a cosmetic layer 11, a reflecting layer 12, an illuminated device 20, a sensor 13 and a controller 14.

The cosmetic layer 11 permits the touch or the hover of finger and other conductive objects, protects the illuminated device 20, the reflecting layer 12 and the sensor 13 and diffuses light beams of the illuminated device 20. In alternative embodiment, the cosmetic layer having various patterns, characters and symbols as the indicators.

The reflecting layer 12 is set between the sensor and the illuminated device 20 for spread the light beam emitted from the light source, and it is a single element or an insulating paint painted on the sensor 13. In other embodiment, the reflecting layer 12 may be omitted.

The sensor 13 detects a hover or a touch of objects such as fingers and stylus, and it is capacitive, resistant or magnetic-induced. The position information detected is one-, two- or multi-dimension coordinates to the controller 14. For instance of the capacitive sensor, the sensor 13 includes a printed circuit board such as flexible printed circuit board on which the traces or the electrodes are formed for sensing the hover or the touch of objects. The controller 14 receives an output signal of the sensor 13 and drives corresponding application programs and illuminated modes.

The illuminated device 20 is set between the cosmetic layer 11 and the sensor 13 or the reflecting layer 12 if exists, and it includes the light guide films for light beams entering from side of the illuminated device 20. Each of the light guide films has a paralleled top and bottom on which the micro members are formed for changing paths of entered light beams, mask members located at an inside position near the edge of the light guild film for masking the light beams emitted into other light guide films and block member for forming regions according to the application. The block members result in the pass or block of the light beams in the individual region, that is, they determines the illuminated regions. The block members are formed inside the guide film, and each one of the at least one block member formed between two adjacent regions to define the regions.

Figure 2:
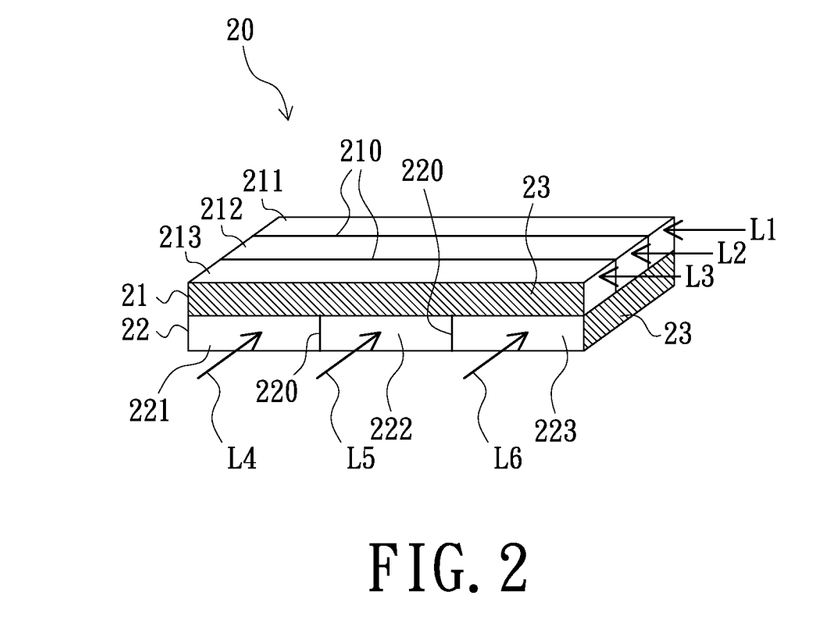
FIG. 2 is a three-dimensional view of an illuminated device in accordance with a preferred embodiment of the present invention.
Figure 3:
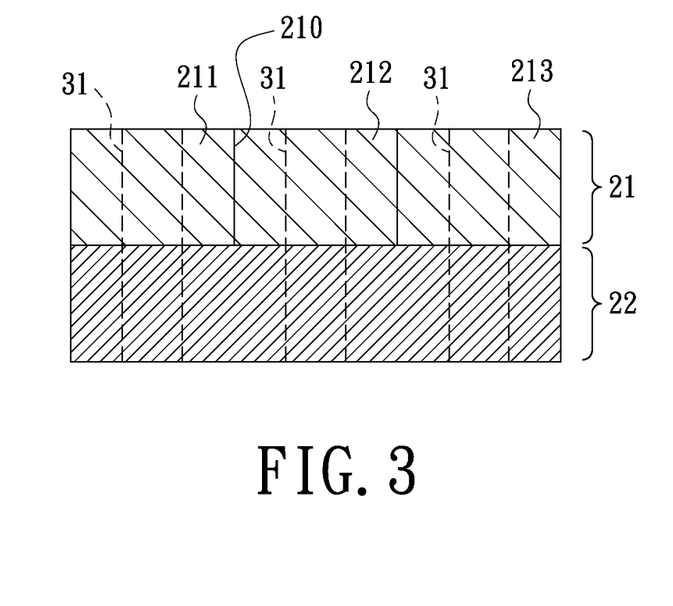
FIG. 3 is a sectional view of an illuminated device in accordance with a preferred embodiment of the present invention.

FIGS. 2 and 3 are a three-dimensional view and a sectional view of the illuminated device respectively. The illuminated device 20 includes light guide film 21 and 22 for exemplary here. It's noted that the number of the light guide films is up to the application. The light sources such as LEDs 31 are set beside the illuminated device 20 for emitting the light beams L1 to L6 to the side of the light guide film 21 and 22. The light source is LED for example, however, it is not intended to be limited to LED.

The first light guide film 21 is defined as many first regions. In the embodiment, first region 211, 212 and 213 in accordance with respective LED 31 are arranged along a first direction such as X axis, and the light beams L1 to L3 of LED 31 are emitted into them. The block member 210 such as kerf or glue rib is set among the first region 211, 212 and 213 for limiting the range of the light beams entered or diffused.

Similarly, the second light guide film 22 is defined as many second regions. In the embodiment, three second region 221, 222 and 223 in accordance with respective LED 31 are arranged along a second direction such as Y axis, and the light beams L4 to L6 of LED 31 are emitted into them. The block member 220 is set among the region 221, 222 and 223 for limiting the range of the light beams entered or diffused.

Figure 4A:
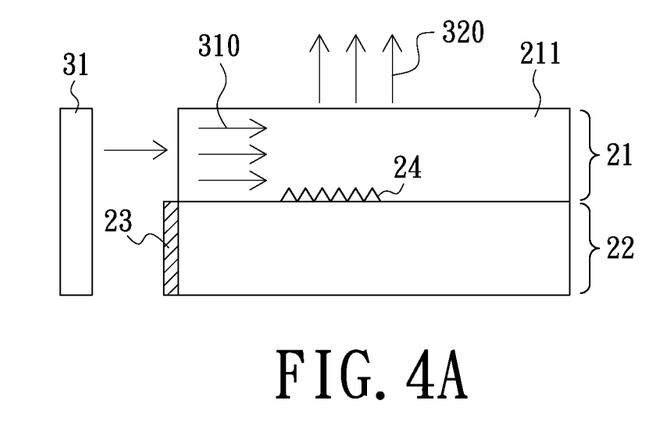
FIG. 4A is a sectional view of an illuminated device, the block members and the micro members in accordance with a preferred embodiment of the present invention.

As shown in FIGS. 2 and 4A, in order to block the light beams L1 to L3 of the LED 31 in accordance with the first light guide film 21 for the second light guide film 22, the mask member 23 such as black adhesive is set in the side of the second light guide film 22. Similarly, in order to block the light beams L4 to L6 of the LED 31 in accordance with the second light guide film 22 for the first light guide film 21, the mask member 23 is set in the side of the first light guide film 21. In alternative embodiment as shown in FIG. 4B, the mask member 23 is a seam 23' located at a proper inside position near the edge of the light guide film 21 and 22 for masking the light beams and changing paths of entered light beams.

Figure 4B:
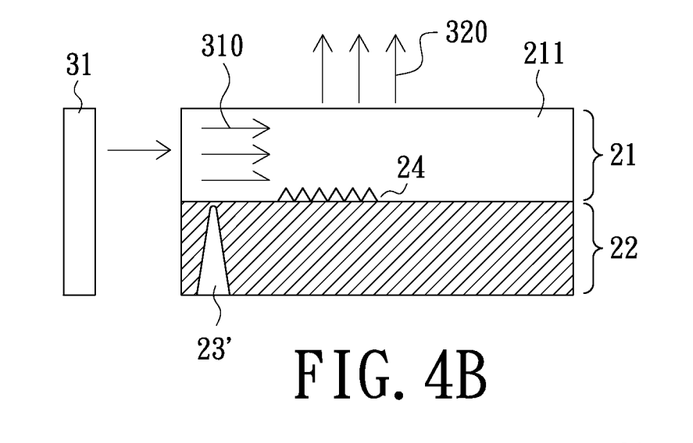
FIG. 4B is a sectional view of an illuminated device, the block members and the micro members in accordance with an alternative preferred embodiment of the present invention.
Figure 4C:
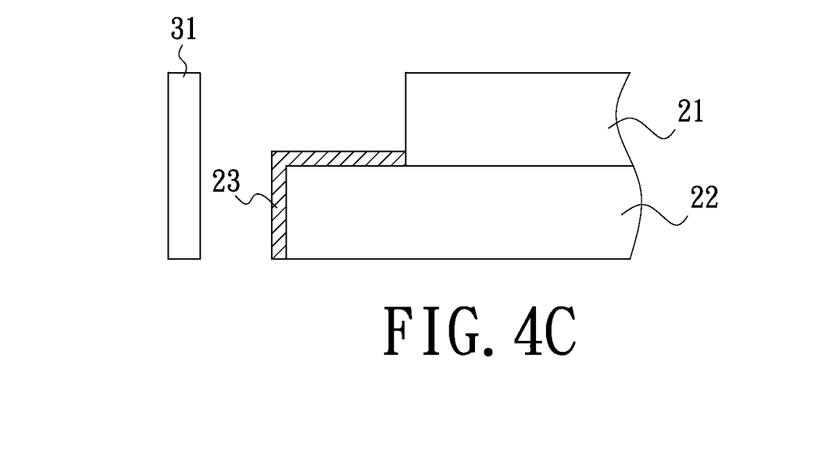
FIG. 4C is a sectional view of setting of the block members in accordance with a preferred embodiment of the present invention.
Figure 4D:
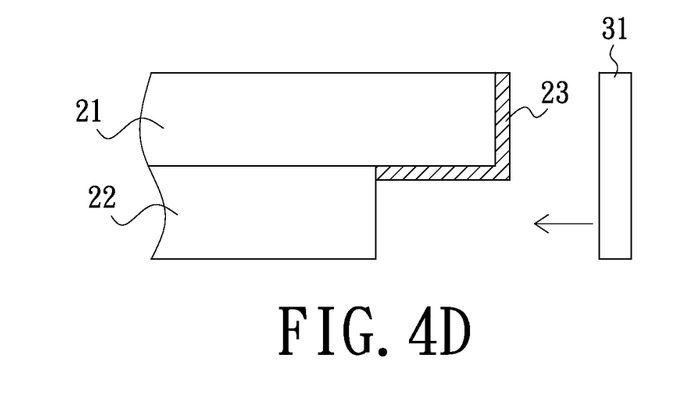
FIG. 4D is a sectional view of setting of the block members in accordance with an alternative preferred embodiment of the present invention.

As shown in FIGS. 4C and 4D, while the first light guide film 21 and the second light guide film 22 are not stacked entirely, the painting range of the mask member 23 such as block adhesive is extended upwardly to a boundary of the bottom of the first light guide film 21 for masking the light beams L4 to L6 of LED 31 in accordance with the second light guide film 22 as shown in FIG. 4D, or extended downwardly to a boundary of the top of the second light guide film 22 for masking the light beams L1 to L3 of LED 31 in accordance with the first light guide film 21 as shown in FIG. 4C.

The micro member 24, which is a micro structure and generated by the screening printing or a laser, is formed on the bottom of the light guide film 21 and 22 of the embodiment as shown in FIGS. 4A and 4B. The shape of micro member 24 is round or other shape which is capable of changing the path of the entering light beam 310 toward the top of the light guide film. The path of the entering light beam 310 in the region having no micro member 24 of the first light film 21 is remained, and it is changed and an outward light beam 320 is generated when the entering light beam 310 encountered the micro member 24. Accordingly, the regions without outward light beam 320 are dark, whereas those with outward light beam 320 are illuminated. Changing the density, the position or the shape of the micro member 24 creates different illuminated modes and vision effect on different regions of the top of the illuminated device 20 and further the cosmetic layer 11.

Figure 5:
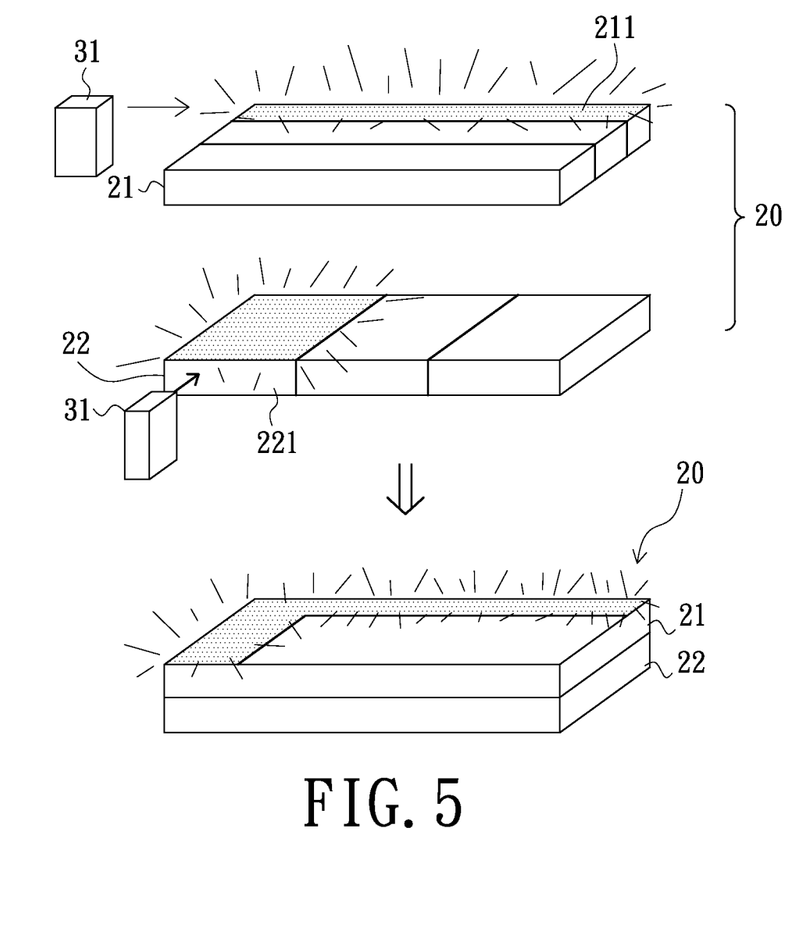
FIG. 5 is a schematic diagram of regional illumination of an illuminated device in accordance with a preferred embodiment of the present invention.

As shown in FIGs. 2 and 5, illuminating together or individually of the first region 211, 212 and 213 and the second region 221, 222 and 223 is controlled through controlling the LEDs 31 and employing the illuminated device 20. For instance, in the embodiment of FIG. 5, the micro members 24 is set on the bottom of the first light guide film 21 and the second light guide film 22, and the first region 211 of the first row of the first light guide film 21 which the light beam entering is illuminated through the micro members 24 while the corresponding LED 31 is lighted up. Similarly, the second region 221 of the first column of the second light guide film 22 which the light beam entering is illuminated through the micro members 24 while the corresponding LED 31 is lighted up. Therefore, the illuminated device 20 is illuminated partially and applied to various operations such as scrolling due to the stack structure.

Figure 6A:
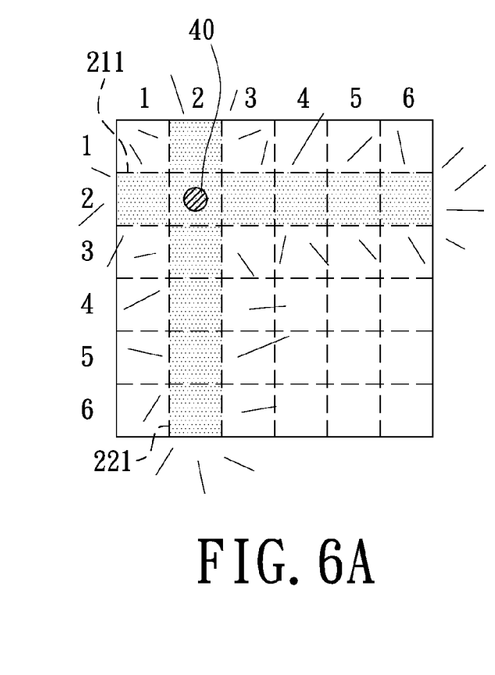
FIG. 6A is a schematic diagram of light effects of an illuminated device operated by one-finger in accordance with a preferred embodiment of the present invention.

As shown in FIG. 6A, the illuminated device 20 is partitioned into six by six, and thus it has six first regions 211 and 221 in the first light guide film 21 and the second light guide film 22 respectively. In the embodiment, switching of the illuminated modes is performed through sensing one finger or multiple fingers by the sensor 13. It senses the number of the fingers by computer programs stored in firmware for switching the illuminated modes. For the one-finger operation, the sensor 13 senses the coordinates of an object 40 when the object 40 such as a finger touching the cosmetic layer 11 is sensed. The controller 14 controls a cross-shaped illumination of the region which the first region 211 and the second region 221 are crossed where the object 40 touched.

Figure 6B:
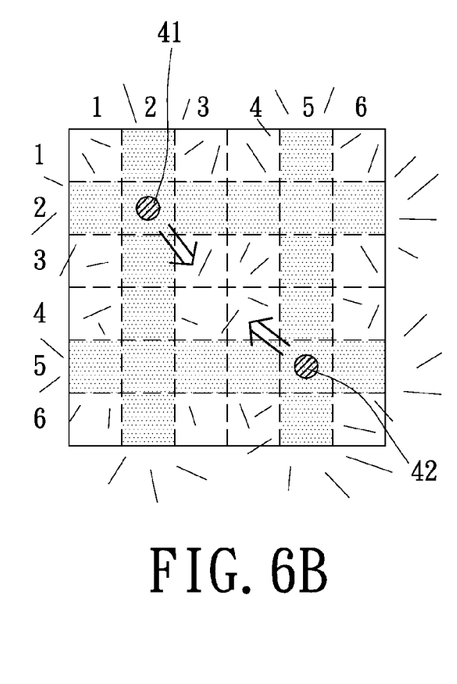
FIGS. 6B and 6C are the schematic diagrams of light effects of an illuminated device operated by multi-finger in accordance with a preferred embodiment of the present invention.
Figure 6C:
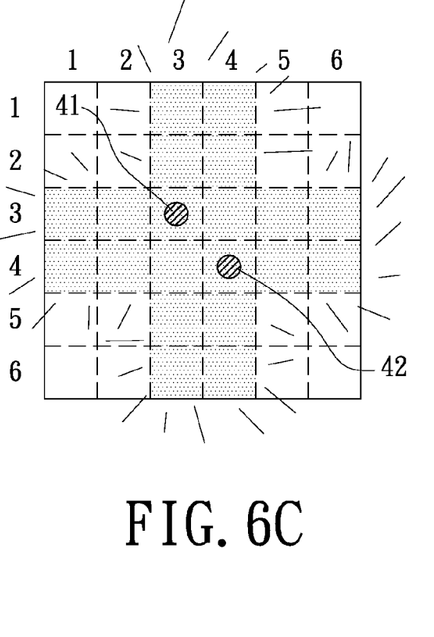

FIGS. 6B and 6C are the schematic diagrams of light effects of an illuminated device operated by multi-finger. As shown in FIGS. 6B and 6C, when the objects such as fingers 41 and 42 touching the cosmetic layer 11 are sensed by the sensor 13, the controller 14 controls an interlaced-shaped illumination of the first region 211 and the second region 221 that the fingers 41 and 42 touched. For a zooming operation, the illuminated and dark regions are changed for the purpose of intuitive operating. In another embodiment, the illumination is in responsive to the rotation of the fingers 41 and 42. The application programs are not intended to be limited herein.

Figure 7A:
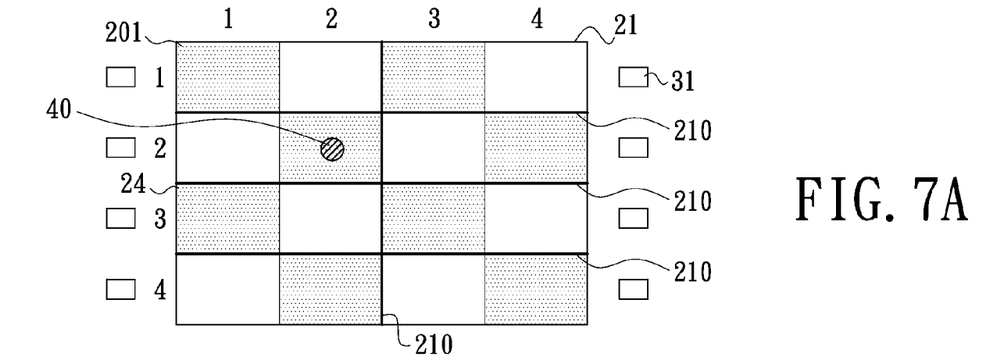
FIGS. 7A and 7B are the schematic diagrams of setting of the mask members in the interlaced regions of illuminated device in accordance with an alternative preferred embodiment of the present invention.
Figure 7B:
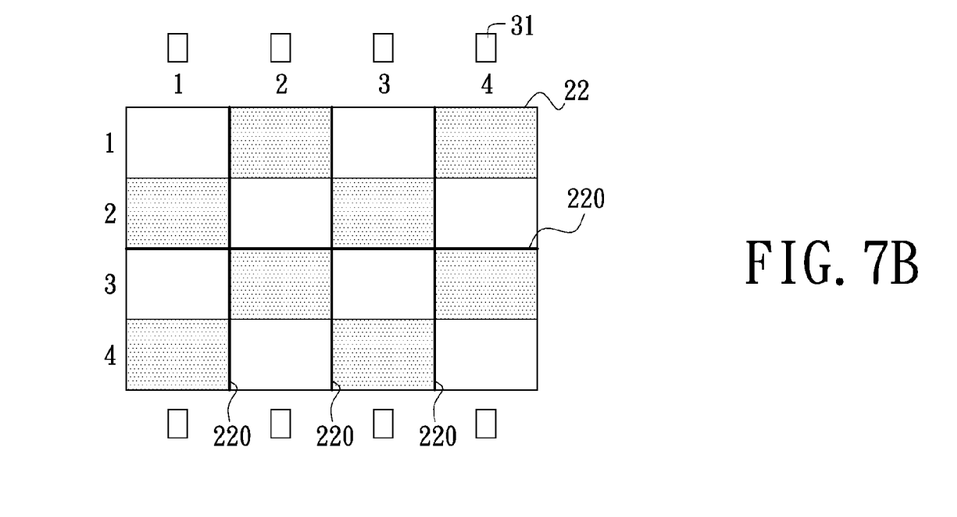

As shown in FIGS. 7A and 7B, the block members 210 are set between the interlaced regions 201 of column 2 and 3 and each row of the first light guide film 21. In addition, the micro members 24 are spaced out the interlaced regions 201 in each column and row of the bottom of the first light guide film 21. Similarly, the block members 220 are set between the interlaced regions 201 of row 2 and 3 and the interlaced regions 201 of each column of the second light guide film 22. The micro members 24 are spaced out the interlaced regions 201 in each column and row of the bottom of the second light guide film 22. It's noted that the interlaced regions 201 having the micro members 24 of each column and row of the first light guide film 21 and the second light guide film 22 are not overlapped. Moreover, the light sources such as LEDs 31 are set row by row in two sides of the first light guide film 21 and column by column in two other sides of the second light guide film 22.

Again, as shown in FIGS. 7A and 7B, the LED 31 controlling the second row of the first light guide film 21 and closing to the object 40 is lighted up when the object 40 touching the interlaced region 201 of the second column and the second row with the micro member 24 is detected, whereas the interlaced region 201 of the first column and the second row of the first light guide film 21 without the micro member 24 is dark. Consequently, the light beams are blocked from entering the interlaced region 201 of the third column and second row by the block member 220. Similarly, the illumination of different interlaced regions 201 for multiple objects such as finger 41 and 42 detected is works in the same concept mentioned. Therefore, setting the block members for the column or row of different light guide films in an application of multi-layer light guide films blocks the light beams of LED 31 entering to interlaced regions 201 unexpected.

In alternative embodiment, the characters, symbols, digits or firm's LOGO are set in the inter- or the intra-layer or the surface of layers of the illuminated device, the sensor 13 is partitioned into corresponding regions in accordance with them and all or parts of them of one column, one row or one layer are shown through regional and layered control. In addition, the sensor 13 senses the information of the characters, symbols and digits and then transmits the sensing result to the controller 14 when some of them are pressed, and thus it provides the touch sensitive surface with functions and entertainment of illumination, button operation and advertising. In other words, the interlaced regions illuminated accompanied with programs of the host provides the indication to users for improving the operation of the touch sensitive surface by one or double clicks or other gestures, and it broaden the range of applications in contrast with the application of substituting for a mouse device.

Figure 8:
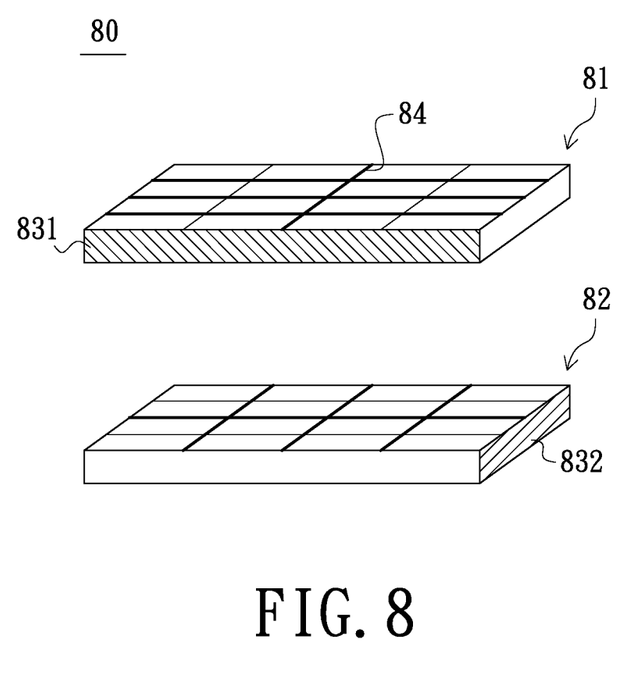
FIG. 8 is a three-dimensional and decomposition view of an illuminated device of illuminated touch sensitive surface module in accordance with a preferred embodiment of the present invention.

FIG. 8 is a three-dimensional and decomposition view of an illuminated device of illuminated touch sensitive surface module. In the embodiment, the illuminated device 80 includes a first light guide film 81, a second light guide film 82, the mask member 831 and 832 and the block member 84. The first and the second light guide film 81 and 82 permits light beams to pass through from the side of the illuminated device 80. The micro members are formed for changing paths of entered light beams. The mask member 831 and 832 blocks the unexpected light beams emitted to the first and the second light guide film 81 and 82, and the block member 84 blocks the un expected light beams emitted to the interlace regions defined. The allocated position and amount of the block members 84 in the single or multiple sides of the interlaced regions or single or multiple interlaced regions of the stacked first and second light guide film 81 and 82 as shown in FIGS. 7A and 7B are determined by applications. Allocating the block member 84 provides not only the touch operation to user but also the joy of fancy display generated by the combination and change of characters, symbols or patterns. In addition, the mask member which is a black adhesive is extended upwardly or downwardly to a boundary of the bottom of the first light guide film or the second light guide film if the areas of the top of the first and the second light guild film are different or the tops of the light guild films are not stacked entirely as shown in FIGS. 4C and 4D.

In alternative embodiment, the mask member is a seam located at an inside position near the edge of the light guild film on the path of entered light beams for blocking, and the micro members on the bottom of the light guide film are the micro structures generated by screening printing or laser. The shape of the micro members are round or other shape which is capable of changing the path of the entering light beam toward the top of the light guide film. In addition, the characters, symbols, digits or firm's LOGO are set in the inter- or the intra-layer or the surface of layers of the illuminated device for providing multiple effects.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An illuminated touch sensitive surface module, comprising:
 a cosmetic layer for permitting light beams to pass through and objects to touch or hover thereon;
 a sensor for sensing position information of the hovering or touching objects;
 an illuminated device with an illuminated mode mounted between the cosmetic layer and the sensor and having at least one guide film with parallel top and bottom, and each one of the at least one guide film having;
  multiple micro members formed on the bottom for changing paths of entered light beams;
  a plurality of regions defined on the guide film; and
  at least one block member formed inside the guide film, and each one of the at least one block member formed between two adjacent regions; and
 a controller connected to the sensor for driving the illuminated mode of the illuminated device according to the position information;
 wherein the regions corresponding to a touched or hovered position are illuminated while the other regions are dark in the illuminated mode.

2. The illuminated touch sensitive surface module of claim 1, wherein the light guide film includes a first light guide film and a second light guide film stacked and multiple mask members formed respectively on different sides of the first and the second light guide film.

3. The illuminated touch sensitive surface module of claim 2, wherein each of the mask members is a black adhesive extended upwardly or downwardly to a boundary of the bottom of the first light guide film or the second light guide film, if the area of the top of the light guide films are different or the tops of the light guide films are not stacked entirely.

4. The illuminated touch sensitive surface module of claim 2, wherein each of the mask members is a seam located at an inside position near the edge of the light guide film on the path of entered light beams.

5. The illuminated touch sensitive surface module of claim 2, wherein the regions of the guide films includes multiple first regions on the first guide film and multiple second regions on the second guide film, and the first regions are formed along a first direction and a second regions are formed along a second direction.

6. The illuminated touch sensitive surface module of claim 5, wherein the first direction is column direction and the second direction is row direction.

7. The illuminated touch sensitive surface module of claim 1, wherein at least one of density, position and shape of the micro members is different for controlling the light effects of each of the regions.

8. The illuminated touch sensitive surface module of claim 1, wherein the micro members are the micro structures generated by screening printing or laser.

9. The illuminated touch sensitive surface module of claim 1, wherein a light effect constituted by the illuminated and the dark regions is cross-shaped, interlaced-shaped or plaid-shaped.

10. The illuminated touch sensitive surface module of claim 9, wherein the interlaced-shaped light effect is in accordance with an application program of object zooming or object rotation.

11. The illuminated touch sensitive surface module of claim 1, wherein the block member is a kerf or a glue rib.

12. The illuminated touch sensitive surface module of claim 1, wherein at least one of inside or surface of the layer is disposed with character, symbol or pattern.

13. The illuminated touch sensitive surface module of claim 1, wherein each region has a light source mounted on an end of the region.

14. The illuminated touch sensitive surface module of claim 1 further comprising a reflecting layer mounted between the at least one light guide film and the sensor.

15. An illuminated device of an illuminated touch sensitive surface module having a plurality of illuminated regions which is mounted above a sensor for sensing the hovering or touching of an object, comprising:
 at least one guide film with parallel top and bottom, and each one of the at least one guide film having;
  multiple micro members formed on the bottom for changing paths of entered light beams;
  a plurality of regions defined on the guide film; and
  at least one block member formed inside the guide film, and each one of the at least one block member formed between two adjacent regions;
 whereby the regions corresponding to a touched or hovered position are illuminated while the other regions are dark.

16. The illuminated device of claim 15, wherein the light guide film includes a first light guide film and a second light guide film stacked, and different sides of the first and the second light guide film have the mask members.

17. The illuminated device of claim 16, wherein each of the mask members is a black adhesive extended upwardly or downwardly to a boundary of the bottom of the first light guide film or the second light guide film, if the areas of the top of the light guide films are different or the tops of the light guide films are not stacked entirely.

18. The illuminated device of claim 16, wherein each of the mask members is a seam located at an inside position near the edge of the light guide film on the path of entered light beams.

19. The illuminated device of claim 16, wherein a plurality of block members are set along a first direction in the first light guide film and a second direction in the second light guide film, and the first direction and the second direction are orthogonal.

20. The illuminated device of claim 16, wherein the regions of the guide films includes multiple first regions on the first guide film and multiple second regions on the second guide film, and the first regions are formed along a first direction and a second regions are formed along a second direction.

21. The illuminated device of claim 20, wherein the first direction is column direction and the second direction is row direction.

22. The illuminated device of claim 15, wherein different light effect constituted by the illuminated and the dark regions is in accordance with respective application program of object zooming or object rotation at least.

23. The illuminated device of claim 15, wherein the block member is a kerf or a glue rib.

24. The illuminated device of claim 15, wherein at least one of density, position and shape of the micro members is different for controlling the light effects of each of the regions, and the micro members are the micro structures generated by screening printing or laser.

25. The illuminated device of claim 19, wherein the first direction is column direction and the second direction is row direction.

26. The illuminated device of claim 15, wherein each region has a light source mounted on an end of the region.

* * * * *